(12) United States Patent
Kuersten et al.

(10) Patent No.: US 10,922,777 B2
(45) Date of Patent: Feb. 16, 2021

(54) CONNECTED LOGISTICS PLATFORM

(71) Applicant: SAP SE, Walldorf (DE)

(72) Inventors: Uwe Kuersten, Karlsruhe (DE); Ulrich Schlueter, Schriesheim (DE); Karthikeyan Loganathan, Bangalore (IN); Niranjan Raju, Bangalore (IN); Andreas Wildhagen, Wiesloch (DE)

(73) Assignee: SAP SE, Walldorf (DE)

( * ) Notice: Subject to any disclaimer, the term of this patent is extended or adjusted under 35 U.S.C. 154(b) by 699 days.

(21) Appl. No.: 14/857,269

(22) Filed: Sep. 17, 2015

(65) Prior Publication Data

US 2017/0039666 A1    Feb. 9, 2017

(30) Foreign Application Priority Data

Aug. 6, 2015 (IN) .......................... 4102/CHE/2015

(51) Int. Cl.

| | |
|---|---|
| *G06Q 50/28* | (2012.01) |
| *H04W 4/021* | (2018.01) |
| *G06Q 10/08* | (2012.01) |
| *G08G 1/00* | (2006.01) |
| *G06Q 30/02* | (2012.01) |
| *G08G 1/127* | (2006.01) |
| *H04W 4/44* | (2018.01) |
| *H04W 12/06* | (2021.01) |

(Continued)

(52) U.S. Cl.
CPC ......... *G06Q 50/28* (2013.01); *G06Q 10/0833* (2013.01); *G06Q 30/0251* (2013.01); *G08G 1/207* (2013.01); *H04W 4/021* (2013.01); *G08G 1/127* (2013.01); *H04L 63/0815* (2013.01); *H04W 4/44* (2018.02); *H04W 12/06* (2013.01); *H04W 12/0802* (2019.01)

(58) Field of Classification Search
CPC ........ H04W 4/021; H04W 4/02; G06Q 10/08; G06Q 50/28; G06Q 10/0833; G06Q 50/30; B60R 25/33; G08G 1/202; G08G 1/207; G01S 19/42
See application file for complete search history.

(56) References Cited

U.S. PATENT DOCUMENTS

| | | | |
|---|---|---|---|
| 6,493,629 B1 * | 12/2002 | Van Bosch ............ | G08G 1/205 |
| | | | 701/515 |
| 6,901,304 B2 | 5/2005 | Swan et al. | |

(Continued)

FOREIGN PATENT DOCUMENTS

| | | |
|---|---|---|
| EP | 1475734 A2 | 11/2004 |
| WO | WO-2008107123 A1 | 9/2008 |

OTHER PUBLICATIONS

Larsson et al., "T4—Telematics for Totally Transparent Transparent Transports", Sep. 13-16, 2005, IEEE, Proceedings on the 8th International IEEE Conference on Intelligent Transportation Systems. p. 467-472 (Year: 2005).*

*Primary Examiner* — Michael P Harrington
*Assistant Examiner* — Brian A Tallman
(74) *Attorney, Agent, or Firm* — Mintz Levin Cohn Ferris Glovsky and Popeo, P.C.

(57) ABSTRACT

A connected logistics platform is provided to integrate data from various logistics sources. The platform can provide rule-based messaging and/or tracking. The platform can also provide selective access to the integrated data based on user role profile. Related system, method, apparatus, and non-transitory computer readable medium are also provided.

22 Claims, 5 Drawing Sheets

(51) Int. Cl.
*H04L 29/06* (2006.01)
*H04W 12/08* (2021.01)

(56) References Cited

U.S. PATENT DOCUMENTS

| | | | |
|---|---|---|---|
| 7,383,284 B2 | 6/2008 | Heinrichs et al. | |
| 7,761,319 B2 | 7/2010 | Gil et al. | |
| 7,849,031 B2 | 12/2010 | Stehle et al. | |
| 8,031,114 B2 | 10/2011 | Kellermeier et al. | |
| 8,452,628 B2 | 5/2013 | Ouimet | |
| 8,761,799 B2 * | 6/2014 | Meredith | H04W 12/06 455/456.1 |
| 2002/0049622 A1 | 4/2002 | Lettich et al. | |
| 2002/0099500 A1 * | 7/2002 | Schmier | G08G 1/123 701/532 |
| 2002/0194016 A1 * | 12/2002 | Moribe | G01C 21/3697 701/469 |
| 2003/0195696 A1 * | 10/2003 | Jones | G06Q 10/08 701/517 |
| 2005/0156715 A1 * | 7/2005 | Zou | B60R 25/1025 340/426.19 |
| 2005/0165639 A1 * | 7/2005 | Ross | G06F 17/30867 705/14.64 |
| 2005/0203683 A1 * | 9/2005 | Olsen | B60R 25/1004 701/29.3 |
| 2006/0047419 A1 * | 3/2006 | Diendorf | G01C 21/26 701/532 |
| 2006/0089886 A1 | 4/2006 | Wong | |
| 2007/0120736 A1 * | 5/2007 | MacKenzie | G01S 13/825 342/357.66 |
| 2007/0179706 A1 * | 8/2007 | McCutchen | G06Q 10/00 701/533 |
| 2007/0210936 A1 * | 9/2007 | Nicholson | G08G 1/123 340/988 |
| 2007/0288294 A1 * | 12/2007 | Olsen, III | G06Q 10/06 235/385 |
| 2008/0268866 A1 | 10/2008 | Sukkarie | |
| 2009/0164118 A1 | 6/2009 | Breen | |
| 2009/0243925 A1 * | 10/2009 | Kellermeier | B60R 25/102 342/357.64 |
| 2009/0287401 A1 * | 11/2009 | Levine | G01C 21/3492 701/117 |
| 2010/0042498 A1 * | 2/2010 | Schalk | G06Q 30/0254 705/14.52 |
| 2010/0088163 A1 | 4/2010 | Davidson et al. | |
| 2010/0094500 A1 * | 4/2010 | Jin | G01C 21/26 701/31.4 |
| 2010/0262521 A1 * | 10/2010 | Robinson | G06Q 10/08 705/29 |
| 2011/0133888 A1 * | 6/2011 | Stevens | G06Q 50/28 340/8.1 |
| 2011/0238300 A1 * | 9/2011 | Schenken | B60W 40/09 701/408 |
| 2012/0054028 A1 * | 3/2012 | Tengler | G01C 21/3697 705/14.49 |
| 2012/0109721 A1 | 5/2012 | Cebon et al. | |
| 2013/0036370 A1 * | 2/2013 | Ananthakrishnan | G06F 3/0488 715/753 |
| 2013/0103300 A1 * | 4/2013 | Rakthanmanon | G01C 21/3484 701/408 |
| 2013/0158778 A1 * | 6/2013 | Tengler | G08G 1/096716 701/31.5 |
| 2013/0275032 A1 * | 10/2013 | Yorke | G08G 1/00 701/119 |
| 2013/0304693 A1 | 11/2013 | Jaeger et al. | |
| 2014/0094989 A1 * | 4/2014 | Dadu | G07C 5/0816 701/1 |
| 2014/0098060 A1 * | 4/2014 | McQuade | G06F 3/045 345/174 |
| 2014/0357295 A1 * | 12/2014 | Skomra | H04W 4/02 455/456.1 |
| 2015/0081157 A1 * | 3/2015 | Banasky, Jr. | G01C 21/3438 701/29.1 |

* cited by examiner

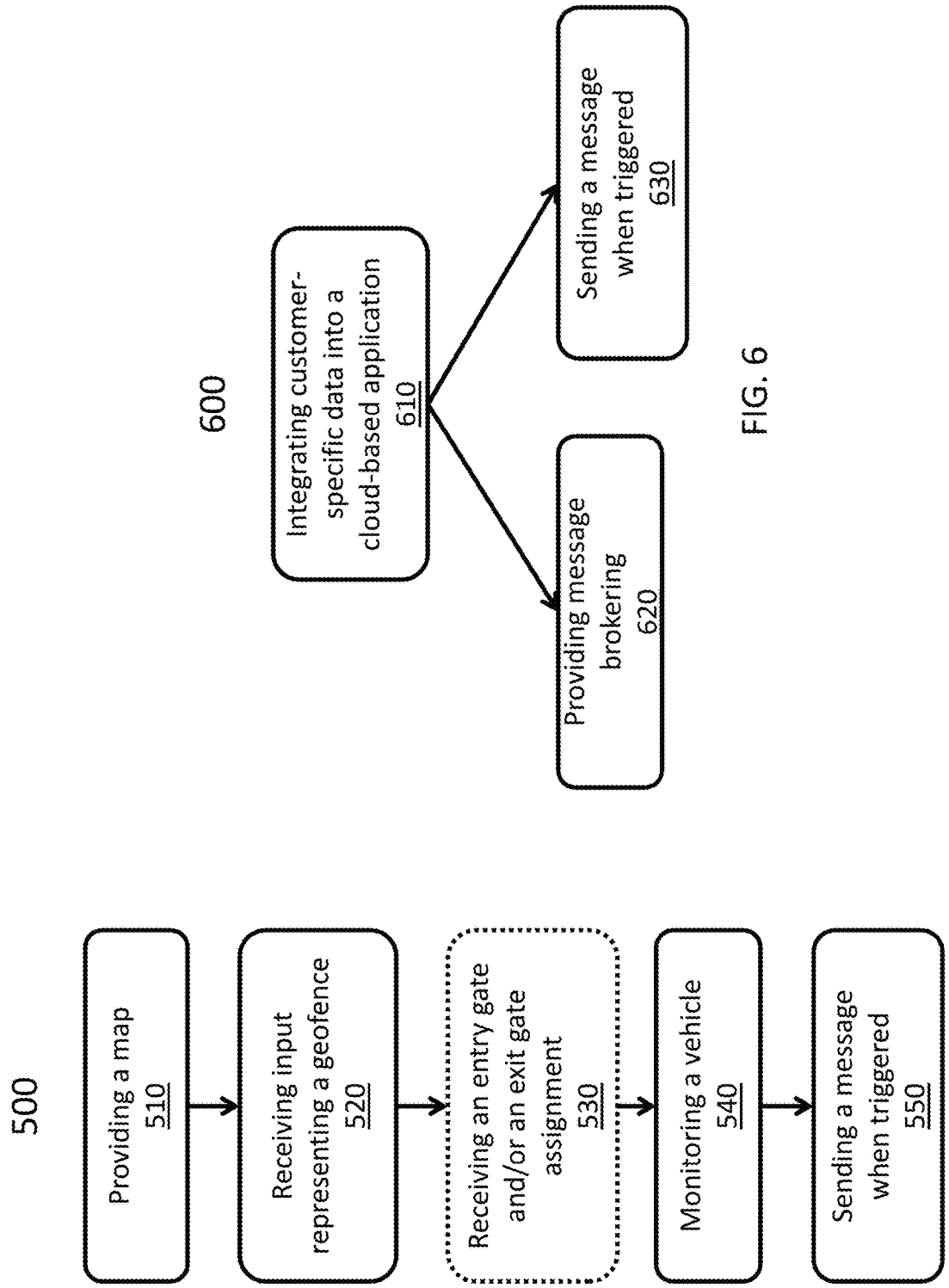

CONNECTED LOGISTICS PLATFORM

CROSS-REFERENCE TO RELATED APPLICATION

This patent application claims the priority of Indian Patent Application No. 4102/CHE/2015, filed on Aug. 6, 2015, the contents of which are incorporated herein by reference in their entireties.

TECHNICAL FIELD

The subject matter described herein relates to a platform for integrating and sharing logistics information from different sources.

BACKGROUND

The logistics business involves many stakeholders including, for example, carriers, hub operators, third party logistics warehouses) and space and service providers. Each stakeholder has their own unique interests and needs in logistics data. For example, carriers are interested in telematics data of their vehicles; hub operators are interested in the operations of their hubs, and the space and service providers are interested in the operations of their businesses. Moreover, the stakeholders are also interest in each other's data. For example, carriers would like to know when a hub is experiencing hub congestions and delays, and the hub operators would like to know if carriers are experiencing traffic congestions and delays. The space and service providers would like to know where the vehicles are to better manage utilization. Each stakeholder, however, generally operates their own systems that are either very difficult or impossible to be integrated with one another. Even if data sharing were possible, the stakeholders would need to make sure that no sensitive information is shared.

SUMMARY

Variations of the present subject matter are directed to methods, systems, devices, and other articles of manufacture that are provided to assist the project manager in managing a project in a project management platform.

The current subject matter provides a method that includes receiving, using at least one data processor, an input representing a geofence on a map. The method can also include monitoring, using at least one data processor, telematics data of a vehicle. When the vehicle enters the geofence, the method can include sending, using at least one data processor, a message to a recipient. The method can also include providing, using at least one data processor, the recipient access to the telematics data while the vehicle is located within the geofence. When the vehicle exits the geofence, the method can terminate, using at least one data processor, access to the telematics data.

In some variations, the method further includes selecting, using at least one data processor, the recipient from a plurality of users based at least in part on user role data associated with the plurality of users. In some variations, the method can also include integrating, using at least one data processor, user role data into a cloud-based application.

In some variations, the method can select the message from a plurality of messages based at least in part on the telematics data. In some variations, the method can monitor, using at least one data processor, traffic data, and sending the message when the traffic data indicates a potential delay for the vehicle. In some variations, hub data, can be monitored and the message includes at least part of the hub data.

In some variations, the telematics data is received from an onboard unit of the vehicle. In some variations, the message is a contextual-based message based on logistics data related to the vehicle.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, by providing a platform that integrates different logistics information, efficiencies and capacity utilization of various providers related to logistics can be improved. For instance, by providing real-time information on the hub-related traffic, vehicles can be managed more efficiently between and within a hub ecosystem. As another example, by providing businesses that operate in the hub's ecosystem with trusted real-time information, efficient process automation can be achieved. By providing location-based services for all participants (stakeholders) in the logistics operations, the current subject matter can provide, for example, smooth shipping, efficient terminal operations, reduced wait times for container pickup, efficient parking, real-time traffic management, smooth traffic flow, real-time and efficient freight forwarding, efficient container operations, ETA of vehicles, and geo-fencing.

BRIEF DESCRIPTION OF THE FIGURES

FIG. 5 is a process flow of an example of the current subject matter; and

FIG. 6 is a process flow of another example of the current subject matter.

DESCRIPTION

Figure 1:
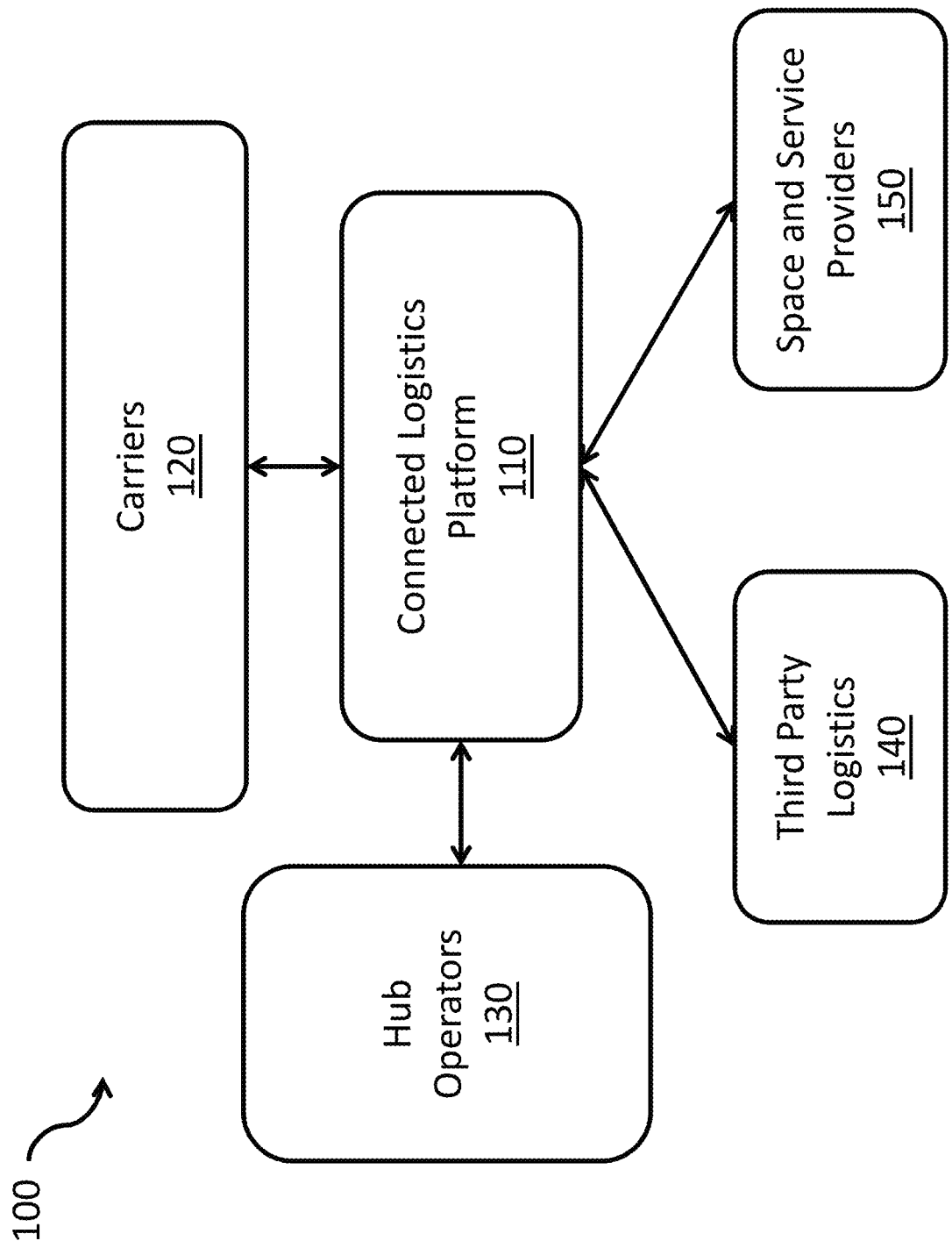
FIG. 1 is a diagrammatic illustration of an example of a connected environment implementing the current subject matter.

FIG. 1 shows an example of a connected environment 100 implementing the current subject matter. Here, connected logistics platform 110 is central to the environment 100 and is in data communication with one or more peripheral parts of the environment including one or more of, for example, carriers 120, hub operators 130, third party logistics (e.g., warehouses and/or terminals) 140, and space and service providers 150. The data communication is generally two-way, but in some instances, one-way communication may be provided. In some variations, one or more peripheral parts of the environment also communicate with one another.

In some variations, carriers 120 can include, for example, sea-based, land-based, or air-based carriers, or any combination thereof. Space and service providers 150 can include, for example, tow-truck operators, parking operators, and/or gas stations.

As can be appreciated by one skilled in the art, implementing the current subject matter can provide many advantages. For example, for third party logistics provider 130 such as warehouses and terminals, the current subject matter can improve/ensure on-time delivery of goods through, e.g., communication channel(s) and transparency on the carriers that are traveling to the warehouses/terminals, and the ability to schedule reliable slots/times for goods pickup and delivery. The current subject matter can provide higher throughputs with fewer assets needed.

As another example, for the carriers and truck drivers of carriers 120), the integration of heterogeneous fleet solutions (platforms) can ease the communication between dispatchers and drivers. By providing location-based information such as the latest traffic situation and/or relevant recommendations on parking and storage, idling times of the vehicles at the terminals and traffic jams can be reduced.

As yet another example, for operators of transport network hubs 130 or public authorities, the current subject matter can provide a real-time transparency of network usage (e.g., road network, rail network, parking spaces, etc.) and the ability to predict impact of maintenance works. The current subject matter can also provide additional community services to the operators or public authorities to enable them to utilize the networks more efficiently and increase utilization.

Each of the stakeholders can gain value from the current subject matter according to their specific businesses.

Figure 2:
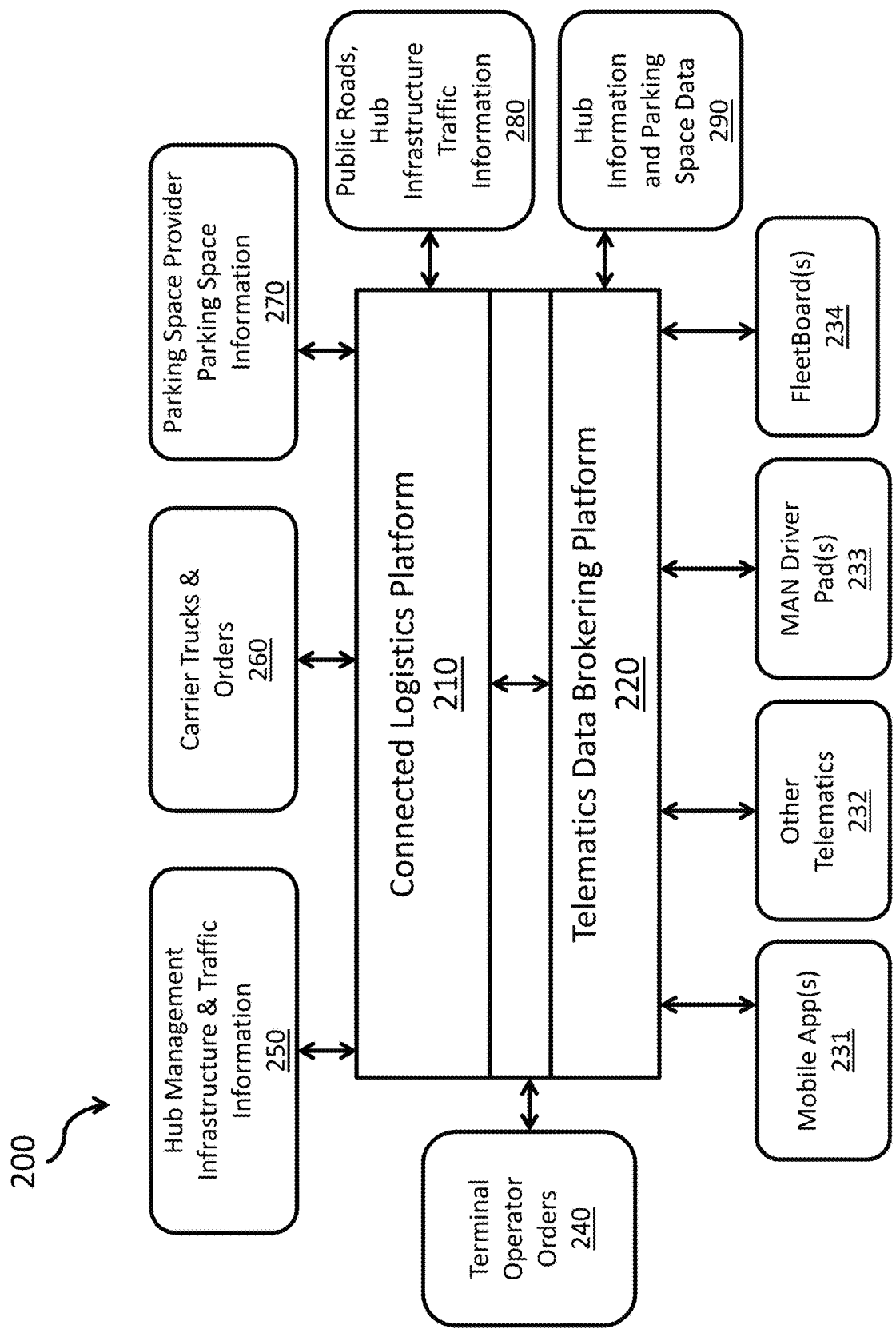
FIG. 2 is a diagrammatic illustration of an example of an implementation of the current subject matter.

References will now be made to FIG. 2, which shows an example of an implementation of the current subject matter using the SAP HANA Cloud platform (HCP) written as native HANA application. It should be noted that this specific implementation is being provided for illustrative purposes and does not limit the scope of the current subject matter. Implementations using other platforms within the scope of the current subject matter are possible.

As shown, connected logistics platform 210 is central to the environment 200. Here, connected logistics platform 210 is in communication with telematics data brokering platform 220 serving as an intermediary between the connected logistics platform 210 and one or more peripheral components including, for example, one or more mobile apps 231, other telematics 232, MAN Driver Pad(s) (e.g., an on-board unit that supports data exchange between truck/truck driver and central administration (e.g., fleet management, dispatcher) via, for example, mobile communication standards), fleetboards 234 (similar to the MAN Driver Pad), and other devices.

Connected logistics platform 210 is also in data communication, for example, to send/receive terminal operator orders 240; hub management infrastructure and traffic information 250; carrier vehicles and orders 260; parking space provider and parking space information 270; public roads, hub infrastructure, and traffic information 280; and hub information and parking space data 290.

In some variations, the current subject matter includes a consumer grade user interface that addresses the needs of different personas to identify and provide values. Some of the capabilities provided by the architecture of the current subject matter include, for example, enabling organizations (and employees) the ability to collaborate on a Business Network. This in turn, could minimize (e.g., reduce or eliminate) entry barriers for an organization to be part of the Business Network, for example, by simplifying the on-boarding through self-registration and invitation processes. This could also enable organization to connect and collaborate (e.g., sharing vehicles, messaging, etc.).

The current subject matter can also enable logistic hub(s) to keep track of traffic incidents and, for example, notify any incidents (e.g., through the input from a hub's internal systems and/or sensors). This also allows real-time traffic incidents to be captured, for example, using input from public road traffic messaging.

The current subject matter can also enable organizations to track real-time positions of their vehicles and notify traffic incidents to vehicles so that they can avoid, for example, traffic congestions at incident source location. This can be achieved, for example, using rule-based messaging and tracking and/or tracing of vehicle/device positions.

The current subject matter can also simplify application administration by providing, for example, first time setup of application and HCP roles, code deployment, application service to assist initial setup, and one time assignment of SPL delivered .hdbroles to HCP_PUBLIC, HCP_SYSTEM roles. For example, the HANA Cloud Platform has certain default user roles such as HCP_PUBLIC for normal business users and HCP_SYSTEM for system administrators. The current subject matter can be configured to deliver certain user roles as part of the software. For example, following the setup guide, during system setup, one can include a business user role in accordance with the current subject matter into the user role HCP_PUBLIC. Similarly, one can include system setup user role in accordance with the current subject matter into user role HCP_SYSTEM. Such steps can help simplify the setup process and/or on-boarding process.

Moreover, the current subject matter can reduce or eliminate the need for detailed user management.

In some variations, the connected logistics platform can be configured to work with clients such as (for example) standards-based browser user-interface built on SAP UI5 technology, telematics on-board units, and/or mobile clients. The connected logistics platform can include a presentation layer/user interface that utilizes SAP UI5 technology, and a business logic layer that utilizes HANA native (XS, SQL, SQL Script). The platform can also provide open analytics and reporting.

In some variations, the connected logistics platform can include an integration middleware using existing integration services such as HANA Cloud Integration, and HANA data persistency. The connected logistics platform can utilize a development environment that includes, for example, HANA Developer Studio, Eclipse, and/or HANA Cloud Platform SDK. In some variations, the application runtime (middleware services, application level gateway, and possibly non XS application services) can include, for example, HANA Cloud Platform JEE runtime (also known as NEO, JPaaS, NetWeaver Cloud).

In some variations, the current subject matter can be configured to support (e.g., integrate) out-of-the box with SAP Transport Management Systems based on SAP Transportation Management.

In some variations, the current subject matter can be configured to expose external facing standard/normalized APIs by means of OData or REST services using JSON data format. The adaptation to other data format or interface technology such as WS* web services or SFTP can be done, for example, in an adapter layer. This type of adapters can be implemented using, for example, SAP HANA Cloud integration or other integration capabilities. As an example, T-System can operate integration capabilities for the Hamburg Port Authority (HPA), thereby acting as system integrator for HPA in the context of connected logistics.

In some variations, the connected logistics platform can be implemented as a cloud service to enable a "business web" of companies that perform their businesses in port areas. In some variations, the platform can be configured so that several logistic hub operators can share one platform instance. This is particularly meaningful in an alliance model (such as "Star Alliance" for airlines).

Figure 3:
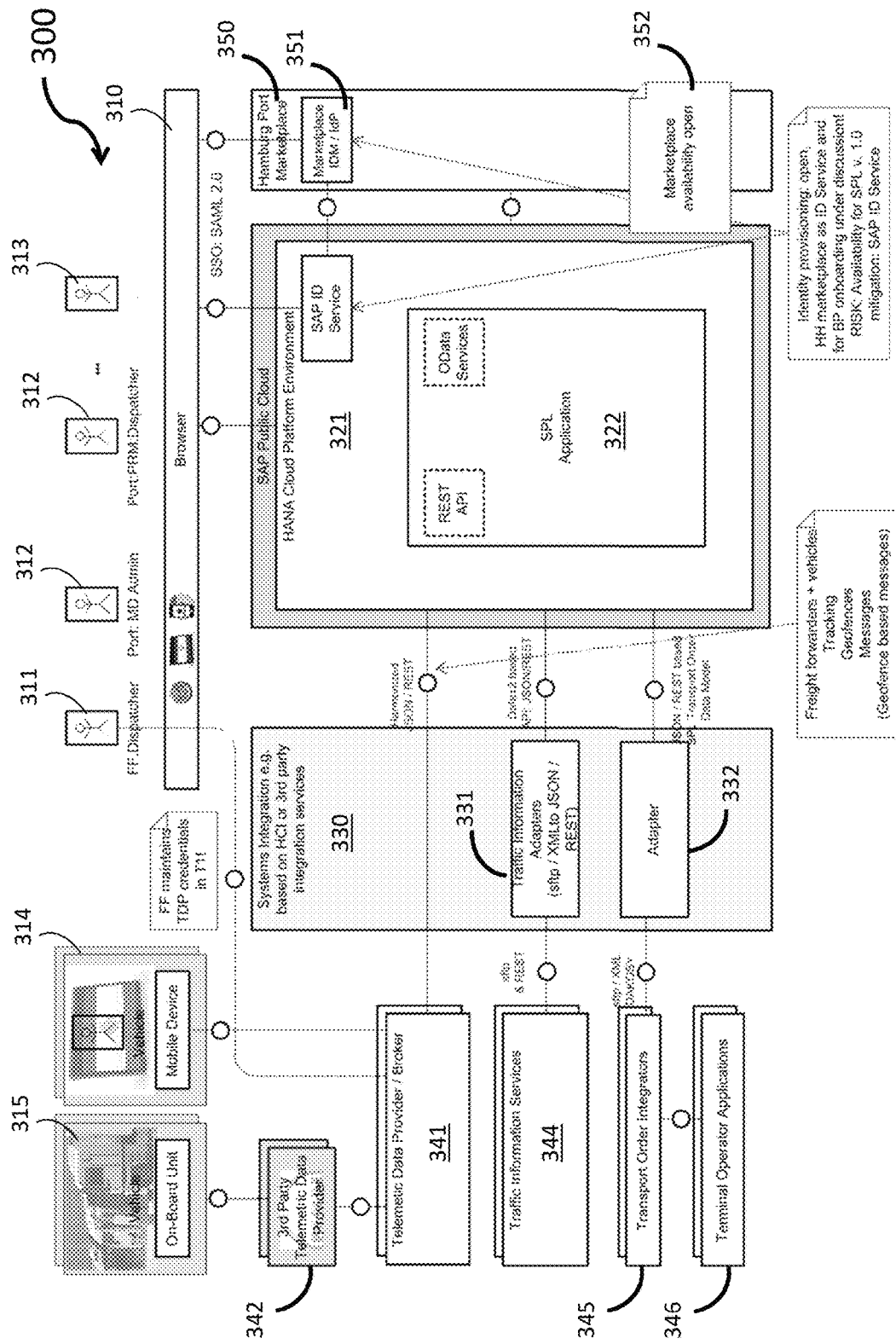
FIG. 3 is a diagrammatic illustration of an example of an application of the current subject matter.

Referring to FIG. 3, the core application of the connected logistics platform cloud service can be configured to run in HANA (for example) using XS and HANA DB capabilities.

In this example, the connected logistics platform is implemented to run in an HANA Cloud Platform Environment 321 on a SAP Public Cloud. These are provided as examples for illustration purposes and do not limit the scope of the current subject matter. Other cloud environment can also be utilized to implement the current subject matter.

Here, the HANA Cloud Platform Environment 321 includes SAP ID Service and SPL Application (or a Connected Logistics platform in accordance with the current subject matter) 322, which can include REST API and OData Services. The platform is in communication with one or more users such as a dispatcher 311, port administrator 312, port dispatcher 312, etc. through, for example, browsers 310.

The platform is also in communication with systems integration 330, which can be, for example, based on HCI or other integration services. The systems integration 330 can include traffic information adapters (e.g., sftp/XMLtoJSON/REST) 331, and an adapter 332. The systems integration 330 can serve as an intermediary between the platform and one or more data providers such as (for example) telematics data providers/brokers 341, traffic information services 344, transport order integrators 345, and terminal operator applications 346. The telematics Data providers/Brokers 341 may in turn obtain telematics data from one or more vehicles (314 and 315) via a third party telematics data provider 342 or directly. The telematics data can be obtained, for example, from an on-board unit on the vehicle 315, or mobile devices associated with a user on the vehicle 314.

The platform can also communicate with a port marketplace such as Hamburg Port Marketplace 350, which can include, for example, a marketplace IDM/IdP 351. In some variations, the platform uses SAP ID Service for user authentication. SAP ID Service can be used as proxy to one or more external Identity Providers. A service provider can leverage its existing identity management and identity provider that may already such as Hamburg Port Marketplace 350. In some variations, the IDM/IdP (Identity Management/Identity Provider) can be integrated with the identity management of a Connected Logistics Platform in accordance with the current subject matter. This can be provided, for example, to enable "one-step" identity management (e.g., user registration and/or authentication) for one or more application provided in the context of the marketplace.

In the example, the Connected Logistics Application 322 can be software operated in the HANA Cloud Platform Environment 321. The Connected Logistics Application 322 interfaces with users of different roles 311, 312, 313 via user agents such as a Web Browser 310. In order to use the cloud service the user needs to authenticate using an identity provider 351 using the authentication protocol SAML 2.0. The Connected Logistics Application 322 interfaces with several external application services/web services to integrate telemetry units such as on-board units 315 and mobile devices 314. As there are several vendors and service providers for telemetry services a Telematics Data Provider/Broker 341 is used as mediator or systems integrator. This allows a stable cloud API for integrating telemetry services. Custom integration can be performed via system integrators.

The Connected Logistics Application 322 interfaces with Traffic Information Services 344 that provide for instance situational information about traffic jams, accidents of the public road infrastructure or privately managed hubs to the SPL application. Connected Logistics Application Service 322 provides a Datex II based interface. To simplify interaction with the Connected Logistics Application 322 the service provides a REST based interface whereas the Datex II standard defines a SOAP based interface. The REST API uses the same payload structure. An adapter 331 which is not part of the service, can be used to translate SOAP to REST (simple http). The adapter 332 can also be provided and operated by a systems integrator to integrate Traffic Information Services with proprietary interfaces with the Connected Logistics Application 322.

The Connected Logistics Application 322 can also interface with planning and execution systems of logistic service providers (not shown) and terminal operators 346. With the high number of logistic service providers and high variety of software solutions supporting logistic service providers in planning and executing tours, 322 provides a cloud API for integration of tour data. System integrators will typically build a custom integration by means of an adapter 332 to integrate IT systems of logistic service providers and terminal operators with the Connected Logistics Application. The Connected Logistic Application supports the situation that a single system integrator performs the integration to several logistic service providers and terminal operators. Bundling reduces the overall load of the communication systems involved in the exchange of tour and location data (345, 332, 322 and 341, 322) which is particularly useful if many devices (vehicles/trucks) are managed by Connected Logistics platform 322: Data of several vehicles can be transferred "in batch" which reduce communication overhead, I/O of the involved network, computation and storage devices—thereby reducing cost of the IT infrastructure of the communication systems.

In some variations, the platform can be configured to allow new business partners and/or users access to the platform using a form based self-registration. In some variations, the platform can be configured to allow, for example, port operators run their own marketplace, and new business partners can sign up using these marketplaces. In some variations, account activation/deactivation can be managed from the outside.

In some variations, the connected logistics platform can be integrated with several external application services such as traffic information services 344, telematics data services from telematics data provide/broker 341 or third party telematics data provider 342, and Transport Management Systems (or systems which expose transport orders, made available by terminal operators).

Figure 4:
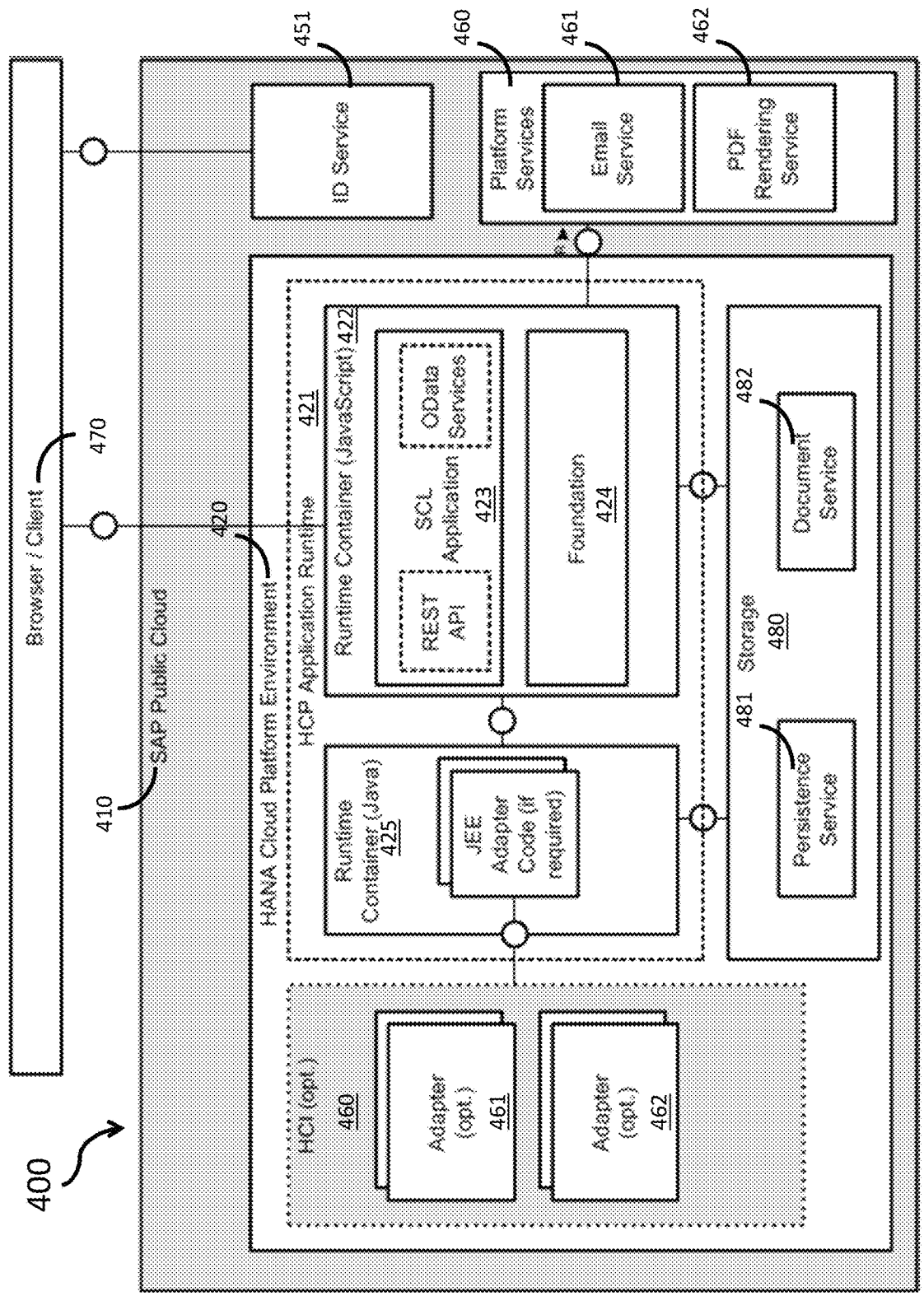
FIG. 4 is a diagrammatic illustration of an example of an implementation of the current subject matter.

FIG. 4 shows an example of an implementation of the connected logistics platform 400 on the SAP Public Cloud 410 using HANA Cloud Platform Environment 420. As shown, the HANA Cloud Platform Environment 420 is in data communication with one or more browsers/clients 470. The Cloud Platform Environment 420 can include HCP Application Runtime (NEO+XS) 421, which can include JEE Container 425 and XS Container 422. JEE Container 425 can include JEE Adapter Code (if required); and XS Container 422 can include Connected Logistics (CL) Application 423 which can include REST API and OData Services), and Foundation 424.

HCP Application Runtime 421 can communicate with an option HCI 460, which can include one or more Adapters 461, 462. HCP Application Runtime 421 can also communicate with Storage 480, which can include Persistence Service 481 and Document Service 482.

HANA Cloud Platform Environment 420 can communicate with Platform Services 460, which can include, for example, Email Service 461 and/or PDF Rendering Service 462 if required.

FIG. 4 depicts the inner structure of implementation of the SCL (Connected Logistics) application. As depicted, the SCL Application can run in the HANA Cloud Platform 420. It can be separated into application runtime 421 deployed into runtime containers. The SCL application can use runtime containers for server side Java 425 and runtime containers for JavaScript 422. In External APIs are exposed as http REST services (REST API) or OData Services. In its current implementation the APIs are implemented in the JavaScript runtime containers. External interfaces that have require specific runtime capabilities such as SOAP Web Services are implemented in Java and run in the Java runtime container 425. SCL 422 interacts platform services exposed as hap based web services 460, 461, 462—and also 482, that is it leverages platform services rather than providing own implementation as part of the application implementation. The SCL application 422 stores own data in SAP HANA—exposed by the HANA Cloud Platform to the application runtime as persistence service 481—and document centric data in the document service 482. The use of the persistence service is done via standard database interface JDBC, the use of the document service is done by means of its http based API based on CMIS.

User agents such as web browsers 470 can interact with SCL 422 using Internet standard protocols such as hap and use standard authentication methods such as SAML 2.0 in the interaction of the user agent 470, the SCL 422 acting as the application service and SAP ID Service 451 acting as the identity provider.

In some variations, the connected logistics platform can use HANA Cloud Platform Services that lie outside the XS stack. Examples of these services include email sending, PDF rendering, and identity provisioning.

In some variations, the SCL (Connected Logistics) Application can include SAP UI5 application (deployed, for example, in HANA XS) or in case of a Java application level gateway, it can be deployed in the JEE container. The SCL application can also include server side Java script code, HANA DB content, and/or Java application content including Java reuse/open source components.

In some variations, the connected logistics platform enables messaging between different users, such as truck drivers and business users of different roles. For example, referring to FIG. 5, using a user interface provided by the platform, the user can be provided with a map (510). Using the map, an end-user (e.g., a dispatcher) can create or edit a geofence on a map (520). The geofence can have any shape (preferably a geometry object having a minimum of 3 points forming a closed area. For example, the geofence can be a triangle, or any other polygonal shape), and can optionally include, for example, an "entry gate" and/or an "exit gate" assigned by the user (530).

The geofence can be provided, for example, for manual and/or automated rule-based messaging. For example, the platform can be configured to monitor a location of a vehicle (540), and a trigger event occurs (e.g., when the vehicle enters the entry gate or the geofence), the platform can perform one or more predetermined actions such as sending a message to the vehicle (e.g., a communication device on the vehicle) (550) and/or other users (e.g., 231-290, 311-315, and 470).

In some variations, the message includes a select set of telematics data of the vehicle. In some variations, the telematics data is selected based at least in part on user role data associated with the recipient of the message. In some variations, the message includes data selected from, for example, Traffic information Services 344, Transport Order Integrators 345, Terminal Operator Applications 346, and other data available from 231-290. In some variations, the selected data is selected based at least in part on user role data associated with the recipient of the message. For example, a user may receive select telematics data (e.g., estimated time of arrival) of a vehicle, if that user is associated with a next stop of the vehicle, when the vehicle enters a geofence. The user may receive select telematics data (e.g., same or different from the earlier one) when the vehicle exits the geofence.

In some variations, instead of (or in addition to) sending a message, the system is configured to enable a user access to select data (e.g., telematics or other data discussed above) based at least in part on user role data of that user. For example, a user associated with a parking space provider may be provided access to certain data such as information related to the vehicles within a geofence.

As another example, a third party logistics provider such as a warehouse or a terminal can utilize the current subject matter to improve/ensure on-time delivery of goods through the Connected Logistics Platform by providing them with data of relevant vehicles. This can allow the third party logistics provider to, for example, schedule reliable/accurate slots/times for goods pickup and delivery.

In some variations, the data that is provided to a particular user are processed to remove sensitive information (e.g., redacted, or converted to an anonymous format) so that the sensitive data is not shared. In some variations, this can be done, for example, based on a user profile data associated with the user that enables/disables certain access to certain data. In some variations, the access to data is dependent at least in part on data such as vehicle information (e.g., a vehicle's tour details/route plan).

In some variations, the access to data associated with, for example, a particular vehicle can be terminated once the vehicle leaves the geofence. In some variations, the user can also send a message (e.g., an ad, coupon, or other information) to a vehicle (for example) when the vehicle is within a geofence.

In some variations, the current subject matter can be configured (e.g., automatically) to visualize and communicate any interference as detected by sensors built into the hub infrastructure (e.g., bridges that are opened to let large sea vessels passing, traffic jams on specific port internal road segments, operational status of container terminals etc.). For example, in the case of approaching vehicles, it is important to be notified about any relevant incident/interference. The relevance is determined by the direction a vehicle is heading to. (e.g., for a vehicle which is heading towards the interference is relevant while it is not relevant for a vehicle which is driving away from the interference). To determine whether a vehicle is approaching the interference is determined by so called "gates" (i.e. gate=edge of the polygon representing a geofence).

In some variations, to determine the period in which a message about interference gets communicated can be determined by defining a "validity period." For example, in case of a road construction planned over a weekend a message with a validity period might be assigned to one or many geofences with set to "from Fri 10:00 pm-Mo 6:00 am". This means that the message about the road construction will be sent to all rucks that enter the specified geofence during the specified period during the specified validity period. Prior and after the validity period the message will not be sent.

In some variations, the message can be a relevant selected from a plurality of messages based on one or more telematics data (e.g., GPS, location, direction, speed, etc.) from the vehicle. This can be triggered, for example, when the vehicle is within a geofence or at any time.

In some variations, a message can be triggered by one or more predetermined rules. For example, the platform can be configured to send a message about a hub-internal interference when entering or leaving a defined geofence through a defined gate within the validity period of the incident message (e.g., location and time-sensitive messaging). Again, the message can be selected based on the relevant data.

The platform can also be configured to utilize other data to trigger a message. For example, the platform can receive real-time data (e.g., telematics data from one or more vehicles and/or other sensors or sources) regarding incidents along a route or at a destination (traffic and hub infrastructure), and when a trigger condition has been met, the platform generates an appropriate message to one or more appropriate vehicles. In some variations, this can be implemented, for example, based on a determination of "impacted" vehicles through geofences and/or gates. This can be particularly helpful where on-board units are in place which support communication with vehicle driver based on simple text messages (no graphical or map based UI for on-board unit).

In some variations, the platform can be configured to provide/share telemetric or other data among one or more registered business partners in a business network. For example, business partners who are interested in a vehicle that is not directly under its control can be provided with access to data related to that vehicle (e.g., permanently or temporarily). As another example, this can be provided when one or more transport orders/tours are served for another business partner.

In some variations, the current subject matter provides an integration of, for example, order management systems with telemetric devices and on-board units. Referring to FIG. 6, this can include, for example, integrating any customer-specific order management systems (e.g., order management data) into a cloud-based application without customer specific enhancements (610). In some variations, the cloud-based application can be configured to provide bi-directional message brokering between the order management systems and one or more onboard devices such as mobile apps and onboard units related to execution of tour orders. Brokering in this context means that the application replicates incoming tour data into the concerned on-board unit and provides tour related information sent from the on-board unit in return to the source system of the tour data (620). For example, a carrier runs an on-premise order management system X where the transportation orders are scheduled then the tour data are replicated into the cloud application. Through the cloud application the tour data are sent to the on-board unit of a vehicle so that the driver is notified about the tour details (incl. stops, freight to be loaded/unloaded, planned time of arrival/departure at each stop). In return the driver can confirm tour specific events through the on-board unit (e.g. "arrived at stop, loading at stop started, etc.) These events are sent to the cloud application and the cloud application provides these events for the order management system. Within the order management system any exception to planned schedules can be now be handled based on real-time information regarding tour execution. An example of such a case could be a vehicle defect such as a motor defect or flat tire. The vehicle driver can use his/her mobile device and on-board unit to notify SCL of the event "Vehicle break down". The integration of the on-board unit with SCL and SCL with the order management system allows real time propagation of the event to the planning system of the carrier which can then update the planning and assign another vehicle and driver to service transport orders that were originally assigned to the defect vehicle. The SCL provide integration provides real time information from system to system and reduces the delay and probability to errors that often happens phone based information exchange. In some variations, the cloud-based application can be configured to provide status and lifecycle management for orders including, for example, event tracking along with execution of orders (630).

In some variations, the current subject matter can provide contextual service offering. For example, the connected logistics platform can be configured to offer one or more services (e.g., promotions of parking and rest facilities) to a user (vehicle driver) of a vehicle based on location and/or traffic/infrastructure status. This can include, for example, current and/or past locations as well as current and/or past traffic/infrastructure status.

In some variations, the current subject matter can be configured to provide methods for service providers to subscribe to the platform and offer relevant services to other participating business partners. In some variations, the current subject matter can also be configured to enable new service providers to offer relevant services in a context and location-aware way. In some variations, the current subject matter can be configured to define and share services in a business partner network.

In some variations, the SCL (Connected Logistics) can operate in the SAP Public Cloud. In some variations, SCL can be configured to enable logistics hubs to logically own and operate the solution.

In some variations, a Subscription Product object can be provided. In some variations, a subscription product groups the services of the application under different business user roles.

In some variations, an organization (e.g., carrier) can self-register with SCL in a particular organization-role by choosing an appropriate service provider (logical) and subscription product of the service provider. Based on the specific subscription product chosen, services available for the business users of the organization can be restricted accordingly. This way SCL can help individual logistics hubs to join the eco system and become service providers. They in turn offer bundled services to other service consumers. In some variations, individual logistic hubs can service providers for carriers, parking providers etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

defining, using at least one data processor, a plurality of roles with differing levels of access, the plurality of roles comprising a first role for a first user and a second role for a second user;

receiving, using the at least one data processor, an input representing a geofence indicative of at least a geometrical area on a map, the geometrical area comprising one or more geofence edges;

monitoring, using the at least one data processor, telematics data indicative of at least a location of a vehicle and of a direction the vehicle is heading;

determining, using the at least one data processor, that the vehicle is within the geofence based on the location and the one or more geofence edges;

sending, using the at least one data processor, a first message to the first user, via an on-board unit in the vehicle, when the location of the vehicle is determined to be within the geofence and when the direction the vehicle is heading is relevant to contents of the first message, the first message contents comprising a notification of an incident in the direction the vehicle is heading and further comprising a subset of the telematics data selected based on the first role for the first user, the sending of the first message includes receiving another telematics data from at least another vehicle concerning the incident, and determining, using the received another telematics data and the geofence, that the at least another vehicle is impacted by the incident and generating a trigger for sending the first message to the first user;

wherein the first message includes at least one context and location-aware service offering generated based on (a) the context of at least one of the telematics data and the another telematics data, and (b) at least one subscription associated with at least one role in the plurality of roles, the at least one subscription identifying one or more context and location-aware service offerings being offered by one or more service providers and defining one or more restrictions for accessing the one or more service offerings within the geofence, the one or more restrictions restricting access by the first user to the one or more service offerings in accordance with at least one subscription associated with the second user;

sending, using the at least one data processor, a second message to the first user, via the on-board unit in the vehicle, when the location of the vehicle is determined to be within the geofence, the second message comprising data indicative of tour details including one or more of scheduled stops, freight to be unloaded, freight to be loaded, scheduled time of arrival at the scheduled stops, and scheduled time of departure at the scheduled stops;

providing, using the at least one data processor, the second user with access to at least a portion of the telematics data while the vehicle is located within the geofence and when the second user is associated with a next stop of the vehicle, the at least the portion of the telematics data selected based on the second role of the second user, the at least the portion of the telematics data being different from the subset of the telematics data;

providing to the second user, using the at least one data processor, data indicative of at least goods being picked up or delivered by the vehicle, wherein sensitive information is removed, based on a user profile of the second user, from the data indicative of at least the goods being picked up or delivered by the vehicle;

determining, using the at least one data processor, that the vehicle is outside of the geofence based on the location and the one or more geofence edges; and terminating, using the at least one data processor, the second user's access to the at least a portion of the telematics data when the vehicle is determined to be outside of the geofence.

2. The method according to claim 1, further comprising:
selecting, using the at least one data processor, the first user from a plurality of users based at least in part on the first role for the first user.

3. The method according to claim 2, further comprising:
integrating, using the at least one data processor, user role data based on the plurality of roles into a cloud-based application.

4. The method according to claim 1, further comprising:
defining, using the at least one data processor, a time frame during which the first message may be sent; and
determining, using the at least one data processor, whether the vehicle is within the geofence during the time frame,
wherein the first message is only sent to the first user when the vehicle is within the geofence during the time frame.

5. The method according to claim 1, wherein the location comprises a global positioning system location of the vehicle, and wherein the telematics data further comprises a speed of the vehicle.

6. The method according to claim 1, wherein the one or more geofence edges comprises an entry gate and an exit gate, wherein the determining that the vehicle is within the geofence comprises determining that the location of the vehicle has entered the entry gate, and wherein the determining that the vehicle is outside of the geofence comprises determining that the location of the vehicle has exited the exit gate.

7. The method according to claim 1, wherein the telematics data is received from the on-board unit of the vehicle.

8. The method according to claim 7, further comprising:
sending, by the at least one data processor, a second message from the second user to the on-board unit of the vehicle while the vehicle is located within the geofence.

9. The method according to claim 1, further comprising:
receiving, by the at least one data processor, a third message from the first user of the on-board unit of the vehicle to the second user, the third message contents comprising a notification of an occurrence of a defect with the vehicle.

10. The method according to claim 9, further comprising:
in response to receiving the third message from the first user of the on-board unit of the vehicle, sending, by the at least one data processor, a fourth message to a driver of another vehicle, via an on-board unit of the another vehicle, the fourth message comprising the data indicative of the tour details, thereby assigning the another vehicle and driver to the tour details originally assigned to the defective vehicle.

11. A non-transitory computer readable medium storing instructions, which when executed by at least one data processor of at least one computing system result in operations comprising:
defining a plurality of roles with differing levels of access, the plurality of roles comprising a first role for a first user and a second role for a second user;
receiving an input representing a geofence indicative of at least a geometrical area on a map, the geometrical area comprising one or more geofence edges;
monitoring telematics data indicative of at least a location of a vehicle and of a direction the vehicle is heading;
determining that the vehicle is within the geofence based on the location and the one or more geofence edges;
sending a first message to the first user, via an on-board unit in the vehicle, when the location of the vehicle is determined to be within the geofence and when the direction the vehicle is heading is relevant to contents of the first message, the first message contents comprising a notification of an incident in the direction the vehicle is heading and further comprising a subset of the telematics data selected based on the first role for the first user, the sending of the first message includes
receiving another telematics data from at least another vehicle concerning the incident, and
determining, using the received another telematics data and the geofence, that the at least another vehicle is impacted by the incident and generating a trigger for sending the first message to the first user;
wherein the first message includes at least one context and location-aware service offering generated based on (a) the context of at least one of the telematics data and the another telematics data, and (b) at least one subscription associated with at least one role in the plurality of roles, the at least one subscription identifying one or more context and location-aware service offerings being offered by one or more service providers and defining one or more restrictions for accessing the one or more service offerings within the geofence, the one or more restrictions restricting access by the first user to the one or more service offerings in accordance with at least one subscription associated with the second user;

sending, using the at least one data processor, a second message to the first user, via the on-board unit in the vehicle, when the location of the vehicle is determined to be within the geofence, the second message comprising data indicative of tour details including one or more of scheduled stops, freight to be unloaded, freight to be loaded, scheduled time of arrival at the scheduled stops, and scheduled time of departure at the scheduled stops;

providing the second user with access to at least a portion of the telematics data while the vehicle is located within the geofence and when the second user is associated with a next stop of the vehicle, the at least the portion of the telematics data selected based on the second role of the second user, the at least the portion of the telematics data being different from the subset of the telematics data;

providing to the second user, using the at least one data processor, data indicative of at least goods being picked up or delivered by the vehicle, wherein sensitive information is removed, based on a user profile of the second user, from the data indicative of at least the goods being picked up or delivered by the vehicle;

determining that the vehicle is outside of the geofence based on the location and the one or more geofence edges; and terminating the second user's access to the at least a portion of the telematics data when the vehicle is determined to be outside of the geofence.

12. The non-transitory computer readable medium according to claim 11, wherein the operations further comprise:

selecting, using the at least one data processor, the first user from a plurality of users based at least in part on the first role for the first user.

13. The non-transitory computer readable medium according to claim 12, wherein the operations further comprise:

integrating, using the at least one data processor, user role data based on the plurality of roles into a cloud-based application.

14. The non-transitory computer readable medium according to claim 11, wherein the operations further comprise:

defining, using the at least one data processor, a time frame during which the first message may be sent; and determining, using the at least one data processor, whether the vehicle is within the geofence during the time frame, wherein the first message is only sent to the first user when the vehicle is within the geofence during the time frame.

15. The non-transitory computer readable medium according to claim 11, wherein the location comprises a global positioning system location of the vehicle, and wherein the telematics data further comprises a speed of the vehicle.

16. The non-transitory computer readable medium according to claim 11, wherein the one or more geofence edges comprises an entry gate and an exit gate, wherein the determining that the vehicle is within the geofence comprises determining that the location of the vehicle has entered the entry gate, and wherein the determining that the vehicle is outside of the geofence comprises determining that the location of the vehicle has exited the exit gate.

17. The non-transitory computer readable medium according to claim 11, wherein the telematics data is received from the on-board unit of the vehicle.

18. The non-transitory computer readable medium according to claim 11, wherein the operations further comprise:

sending, by the at least one data processor, a second message from the second user to the on-board unit of the vehicle while the vehicle is located within the geofence.

19. A system comprising:

at least one data processor; and memory storing instructions which, when executed by the at least one data processor, result in operations comprising:

defining a plurality of roles with differing levels of access, the plurality of roles comprising a first role for a first user and a second role for a second user;

receiving an input representing a geofence indicative of at least a geometrical area on a map, the geometrical area comprising one or more geofence edges;

monitoring telematics data indicative of at least a location of a vehicle and of a direction the vehicle is heading;

determining that the vehicle is within the geofence based on the location and the one or more geofence edges;

sending a first message to the first user, via an on-board unit in the vehicle, when the location of the vehicle is determined to be within the geofence and when the direction the vehicle is heading is relevant to contents of the first message, the first message contents comprising a notification of an incident in the direction the vehicle is heading and further comprising a subset of the telematics data selected based on the first role for the first user, the sending of the first message includes receiving another telematics data from at least another vehicle concerning the incident, and determining, using the received another telematics data and the geofence, that the at least another vehicle is impacted by the incident and generating a trigger for sending the first message to the first user;

wherein the first message includes at least one context and location-aware service offering generated based on (a) the context of at least one of the telematics data and the another telematics data, and (b) at least one subscription associated with at least one role in the plurality of roles, the at least one subscription identifying one or more context and location-aware service offerings being offered by one or more service providers and defining one or more restrictions for accessing the one or more service offerings within the geofence, the one or more restrictions restricting access by the first user to the one or more service offerings in accordance with at least one subscription associated with the second user;

sending, using the at least one data processor, a second message to the first user, via the on-board unit in the vehicle, when the location of the vehicle is determined to be within the geofence, the second message comprising data indicative of tour details including one or more of scheduled stops, freight to be unloaded, freight to be loaded, scheduled time of arrival at the scheduled stops, and scheduled time of departure at the scheduled stops;

providing the second user with access to at least a portion of the telematics data while the vehicle is located within the geofence and when the second user is associated with a next stop of the vehicle, the at least the portion of the telematics data selected based on the second role of the second user, the at least the portion of the telematics data being different from the subset of the telematics data;

providing to the second user, using the at least one data processor, data indicative of at least goods being picked up or delivered by the vehicle, wherein sensitive information is removed, based on a user profile of the second user, from the data indicative of at least the goods being picked up or delivered by the vehicle;

determining that the vehicle is outside of the geofence based on the location and the one or more geofence edges; and terminating the second user's access to the at least a portion of the telematics data when the vehicle is determined to be outside of the geofence.

20. The system according to claim 19, wherein the operations further comprise:

defining, using the at least one data processor, a time frame during which the first message may be sent; and determining, using the at least one data processor, whether the vehicle is within the geofence during the time frame, wherein the first message is only sent to the first user when the vehicle is within the geofence during the time frame.

21. The system according to claim 19, wherein the one or more geofence edges comprises an entry gate and an exit gate, wherein the determining that the vehicle is within the geofence comprises determining that the location of the vehicle has entered the entry gate, and wherein the determining that the vehicle is outside of the geofence comprises determining that the location of the vehicle has exited the exit gate.

22. The system according to claim 19, wherein the telematics data is received from an onboard unit of the vehicle, and wherein the operations further comprise:

sending, by the at least one data processor, a second message from the second user to the on-board unit of the vehicle while the vehicle is located within the geofence.

* * * * *